No. 876,616. PATENTED JAN. 14, 1908.
C. ZEGLEN.
CUSHION TIRE.
APPLICATION FILED JAN. 28, 1907.

Witnesses:
A. M. Bunn
W. L. Hall

Inventor:
Casimir Zeglen,
by Poole Brown
Attys.

UNITED STATES PATENT OFFICE.

CASIMIR ZEGLEN, OF CHICAGO, ILLINOIS.

CUSHION-TIRE.

No. 876,616.

Specification of Letters Patent.

Patented Jan. 14, 1908.

Application filed January 28, 1907. Serial No. 354,565.

*To all whom it may concern:*

Be it known that I, CASIMIR ZEGLEN, a citizen of the United States, and a resident of Chicago, in the county of Cook and State of Illinois, have invented certain new and useful Improvements in Cushion-Tires; and I do hereby declare that the following is a full, clear, and exact description thereof, reference being had to the accompanying drawings, and to the letters of reference marked thereon, which form a part of this specification.

This invention relates to improvements in cushioned vehicle tires and refers more specifically to improvements in the tires designed to afford protection against punctures or other injuries to the tire while in use, while retaining the cushion properties of the tire.

The invention consists in the matters hereinafter set forth and more particularly pointed out in the appended claims.

Figure 1:
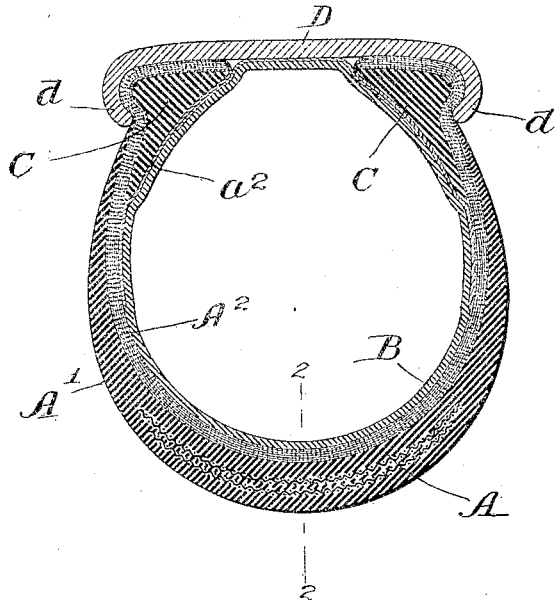
Figure 2:
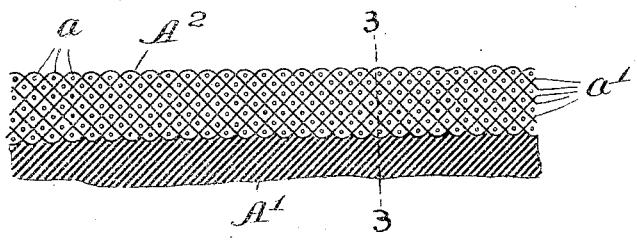
Figure 3:
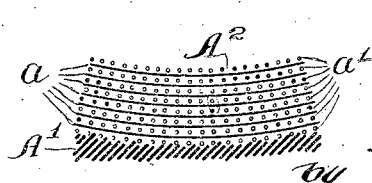

In the drawings:—Figure 1 is a cross-section taken through a double tube or clencher tire made in accordance with my invention. Fig. 2 is an enlarged section, taken on line 2—2 of Fig. 1. Fig. 3 is a section, taken on line 3—3 of Fig. 2.

My invention is herein shown as embodied in a double tube or clencher tire composed of an outer sheath A and an inner inflatable and deflatable tube B. The sheath is made of a layer $A^1$ of rubber or like material and an inner layer of fabric $A^2$ of closely woven, soft fiber strands of high tensile strength. The said fabric is of multi-ply construction, it comprising a number of superposed filling or weft threads $a$ which are bound together in a single thickness mass by the warp threads $a^1$ which are interlaced from one side to the other of the fabric, as shown more clearly in Fig. 2. This manner of weaving the fabric produces an exceedingly compact and impenetrable shield or layer which serves to resist penetration by sharp articles.

When my invention is embodied in the type of tire herein shown, the fabric layer or member of the tire may be woven in the form of an elongated flat strip of the required length to extend circumferentially about the tire, and proper width to extend from side to side of the tire sheath. The said strip is thereafter united to the rubber layer of the sheath under pressure and in the presence of heat, in such manner that the surface of the rubber of said layer adjacent to the surface of the fabric layer becomes softened, and the softened parts are forced into the surface interstices of the fabric. When the parts are cooled they are permanently united to produce a unitary sheath structure. The pressure applied to the fabric when uniting the same with the rubber layer of the shield is such as to permanently compact and render more dense the fabric structure thus adding to its resistance to penetration. A material which I have used with successful results is Japanese silk but it will be understood that other materials having the same general properties, as to tensile strength, elasticity of fiber and capacity for close weaving may be employed.

The fabric, preparatory to being united with the rubber member or layer of the sheath, may be impregnated with a rubber solution by mixing the rubber with a proper solvent and evaporating the solvent after the fabric is impregnated. This I have found to materially increase the impenetrability of the tires. I have also found that a puncture of a tire made with the fabric herein described is followed by a tendency to close the puncture opening, this being due to the character of the weaving and probably to the treatment of the fabric to which reference has been made.

In weaving the fabric strip for the type of tire herein illustrated, the warp threads at the longitudinal center of the strip, or that constituting the tread portion of the fabric layer of the tire, are pressed compactly together in the weaving operation, as indicated in Fig. 1, while the warp threads at the margins are more loosely woven in the fabric. This arrangement provides flexible margins for the strip which are readily made up into the sides of the sheath, while the capacity of the tread portion thereof to resist penetration is greatly increased.

The sheath is provided at its margins with the usual marginal ribs or enlargements C C designed for interlocking engagement with the undercut flanges $d$ $d$ of the wheel rim D. The yielding layer of the sheath is thickened at its tread in a familiar manner and may be reinforced by embedding strips of fabric therein. The flexible margins of the fabric are herein shown as extending over the outer sides of the marginal, interlocking ribs of the sheath and are turned inwardly over the inner sides of said ribs. A cover $a^2$ made of canvas or other suitable material is applied to said fabric on the inner side of the sheath and extends over and outside of the ribs in the manner shown in Fig. 1. In this manner the ribs are firmly joined to the sheath.

The fabric is so woven that the filling or weft threads extend around the cross-section of the tire transverse to the axis of the tube, while the warp threads extend circumferentially about the tire. This arrangement of the filling or weft threads, which are straight and practically inextensible, reinforces the sheath against internal pressure tending to disrupt the same, such as occurs upon explosion of the inner or inflatable tube. The tire thus becomes explosion proof.

A further feature of importance in the use of the silk and like fabric woven as described (in addition to those before referred to) is that it shows a much greater cohesion to the rubber than materials heretofore used, thus producing a highly efficient and reliable connection between the rubber member of the sheath and the fabric reinforcing member. A further additional feature of advantage arising from the use of the fabric layer herein described is that pressure on the tire, tending to displace the strands of the fabric relatively to each other, due either to the tangential pull on the tire when rotating in contact with a roadway and carrying a load, or to contact with bodies tending to indent or puncture the same, does not cause friction due to relative slipping of the strands upon each other, such as occurs in a stiffer or less pliable fabric. The tendency of the tire to overheat, therefore, on account of such friction is largely, if not altogether, overcome. The term "cushion" as applied to the tire herein is intended to include all forms of yielding or resilient tires to which my invention may be applied.

I claim as my invention:

1. In a cushion tire, an outer rubber layer on which is formed the tread and an inner flexible multi-ply fabric made of closely woven fiber strands having high tensile strength, wherein the filling threads are superposed one on the other and the closely spaced warp threads are interlaced through the filling threads entirely from one side of the fabric to the other, thus binding the superposed filling threads together in a mass of single thickness to produce a thick compact fabric, the material of said rubber layer being pressed into the surface interstices of the fiber to permanently join the rubber and fabric together.

2. In a cushion tire, an outer rubber layer on which is formed the tread and an inner flexible multi-ply fabric made of closely woven fiber strands having high tensile strength, wherein the filling threads are superposed one on the other and the closely spaced warp threads are interlaced through the filling threads entirely from one side of the fabric to the other, thus binding the superposed filling threads together in a mass of single thickness to produce a thick compact fabric, the material of said rubber layer being pressed into the surface interstices of the fiber to permanently join the rubber and fabric together, said filling threads being straight and inextensible and extending around the cross-section of the tire.

3. In a cushion tire, an outer rubber layer on which is formed the tread, and an inner flexible, multi-ply layer made of closely woven fiber strands having high tensile strength wherein the filling threads are superposed one on the other and the warp threads are interlaced through the filling threads entirely from one side to the other of the fabric to bind the superposed filling threads in a mass of single thickness, said warp threads extending circumferentially of the tire and pressed compactly together at the tread portion of the tire and being woven more loosely in the fabric at the sides thereof.

4. In a cushion tire, an outer rubber layer on which is formed the tread and an inner flexible multi-ply fabric made of closely woven silken strands, wherein the filling threads are superposed one on the other and the closely spaced warp threads are interlaced through the filling threads entirely from one side of the fabric to the other, thus binding the superposed filling threads together in a mass of single thickness to produce a thick compact fabric, the material of said rubber layer being pressed into the surface interstices of the fiber to permanently join the rubber and fabric together.

5. In a cushion tire, a thick reinforcing silken fabric of multi-ply structure, wherein the filling threads, are superposed one upon the other and are united by the warp threads which are interlaced through the filling threads entirely from one side to the other of the fabric.

6. In a cushion tire, a thick reinforcing silken fabric of multi-ply structure, wherein the filling threads, are superposed one upon the other and are united by the warp threads which are interlaced through the filling threads entirely from one side to the other of the fabric, said fabric being woven compactly at its central or tread portion and being woven loosely at the sides thereof.

In testimony, that I claim the foregoing as my invention I affix my signature in the presence of two witnesses, this 19th day of January, A. D. 1907.

CASIMIR ZEGLEN.

Witnesses:
WILLIAM L. HALL,
GEORGE R. WILKINS.